United States Patent [19]

Oh et al.

[11] Patent Number: 5,570,125

[45] Date of Patent: Oct. 29, 1996

[54] METHOD OF CONTROLLING TELEVISION BROADCASTING CALL IN ASYNCHRONOUS TRANSFER MODE SWITCHING SYSTEM

[75] Inventors: Moon K. Oh; Mi S. Han; Seung H. Kim; Young S. Kim, all of Daejeon, Rep. of Korea

[73] Assignee: Electronics and Telecommunications Research Institute, Seoul, Rep. of Korea

[21] Appl. No.: 336,647

[22] Filed: Nov. 4, 1994

[30] Foreign Application Priority Data

Nov. 6, 1993 [KR] Rep. of Korea .................. 1993-23537

[51] Int. Cl.$^6$ ....................................................... H04N 7/00
[52] U.S. Cl. .................... 348/6; 348/12; 348/13; 348/18; 370/60.1; 370/94.1
[58] Field of Search ................... 348/6, 12, 13, 348/18, 19; 370/60, 60.1, 94.1, 94.2, 58.1, 58.2; 455/3.1, 4.2, 5.1; H04N 7/00, 7/10, 7/14

[56] References Cited

U.S. PATENT DOCUMENTS 5,307,344 4/1994 Mueller et al. .......................... 370/60
5,311,502 5/1994 Mueller et al. .......................... 370/60
5,321,692 6/1994 Wallmeier ............................... 370/60
5,337,307 8/1994 Sato et al. ............................... 370/60

*Primary Examiner*—Safet Metjahic
*Assistant Examiner*—Nina N. West
*Attorney, Agent, or Firm*—Spencer & Frank

[57] ABSTRACT

A method of controlling a television broadcasting call in an ATM switching system in which a television broadcasting service as one of B-ISDN services can be provided through an ATM switching network. The provision of the television broadcasting call in the ATM switching system is not performed by previously connecting all information transmission paths between a broadcasting source and a viewer (subscriber) but by connecting information transmission paths of the nearest switching modules between the broadcasting source and the viewer according to a requirement of the viewer under the condition that a semi-permanent connection is made between the broadcasting source and the ATM switching system. Therefore, the processing capability of the ATM switching system can be enhanced. The present invention can basically realize various B-ISDN services in the future.

8 Claims, 9 Drawing Sheets

FIG. 9

METHOD OF CONTROLLING TELEVISION BROADCASTING CALL IN ASYNCHRONOUS TRANSFER MODE SWITCHING SYSTEM

BACKGROUND OF THE INVENTION

1. Field of the Invention

The present invention relates to a method of controlling a television broadcasting call in an asynchronous transfer mode (referred to hereinafter as ATM) switching system in which a television broadcasting service as one of broadband integrated services digital network (referred to hereinafter as B-ISDN) services can be provided through an ATM switching network.

2. Description of the Prior Art

A conventional call processing technique is mainly adapted to process a voice and low-speed data. Recently, a communication network has been required according to the increase of an information communication to provide high-speed communication services including a high-speed data communication service, a still picture transmission service and a motion picture transmission service. According to such a requirement, there has keenly been required an ATM switching technique which is capable of processing various traffics.

SUMMARY OF THE INVENTION

Therefore, the present invention has been made in view of the above problem, and it is an object of the present invention to provide a method of controlling a television broadcasting call in an ATM switching system in which a television broadcasting service as one of B-ISDN services can be provided through an ATM switching network.

In accordance with the present invention, the above and other objects can be accomplished by provision of a method of controlling a television broadcasting call in an asynchronous transfer mode switching system having an interconnection switch network module which is a switch network of a center interconnection module, access switching network modules of access switching modules which are subscriber switching modules for performing concentrating operations, link interface modules, each of which performs a link interface operation between a corresponding one of said access switching module and said center interconnection module, subscriber interface modules for performing subscriber interface operations and trunk interface modules for performing trunk interface operations, comprising the steps of (a) connecting a semi-permanent virtual channel between a broadcasting source and a broadcasting source one of said access switching modules to transfer broadcasting information from said broadcasting source to said broadcasting source access switching module and discriminating whether a broadcasting path is present between a viewer one of said access switching modules and said broadcasting source, upon receiving a broadcasting call setting request from a viewer; (b) connecting newly the viewer to said viewer access switching module to set the broadcasting call, if it is discriminated at said step (a) that the broadcasting path is present between said viewer access switching module and said broadcasting source; (c) discriminating whether the broadcasting path is present between said center interconnection module and said broadcasting source, if it is discriminated at said step (a) that the broadcasting path is not present between said viewer access switching module and said broadcasting source; (d) connecting newly the viewer to said viewer access switching module and said viewer access switching module to said center interconnection module to set the broadcasting call, if it is discriminated at said step (c) that the broadcasting path is present between said center interconnection module and said broadcasting source; (e) connecting newly said broadcasting source access switching module to said center interconnection module, said center interconnection module to said viewer access switching module and said viewer access switching module to the viewer to set the broadcasting call, if it is discriminated at said step (c) that the broadcasting path is not present between said center interconnection module and said broadcasting source; (f) discriminating whether the broadcasting call is present for a different viewer in said viewer access switching module, upon receiving a broadcasting call release request from the viewer; (g) releasing only the broadcasting path between the viewer and said viewer access switching module if it is discriminated at said step (f) that the broadcasting call is present for the different viewer in said viewer access switching module; (h) discriminating whether the broadcasting call is present between said center interconnection module and a different viewer one of said access switching modules, if it is discriminated at said step (f) that the broadcasting call is not present for the different viewer in said viewer access switching module; (i) releasing the broadcasting path between said viewer access switching module and said center interconnection module and the broadcasting path between the viewer and said viewer access switching module if it is discriminated at said step (h) that the broadcasting call is present between said center interconnection module and said different viewer access switching module; and (j) releasing the broadcasting path between said broadcasting source access switching module and said center interconnection module, the broadcasting path between said center interconnection module and said viewer access switching module and the broadcasting between said viewer access switching module and the viewer if it is discriminated at said step (h) that the broadcasting call is not present between said center interconnection module and said different viewer access switching module.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENT

Figure 1:
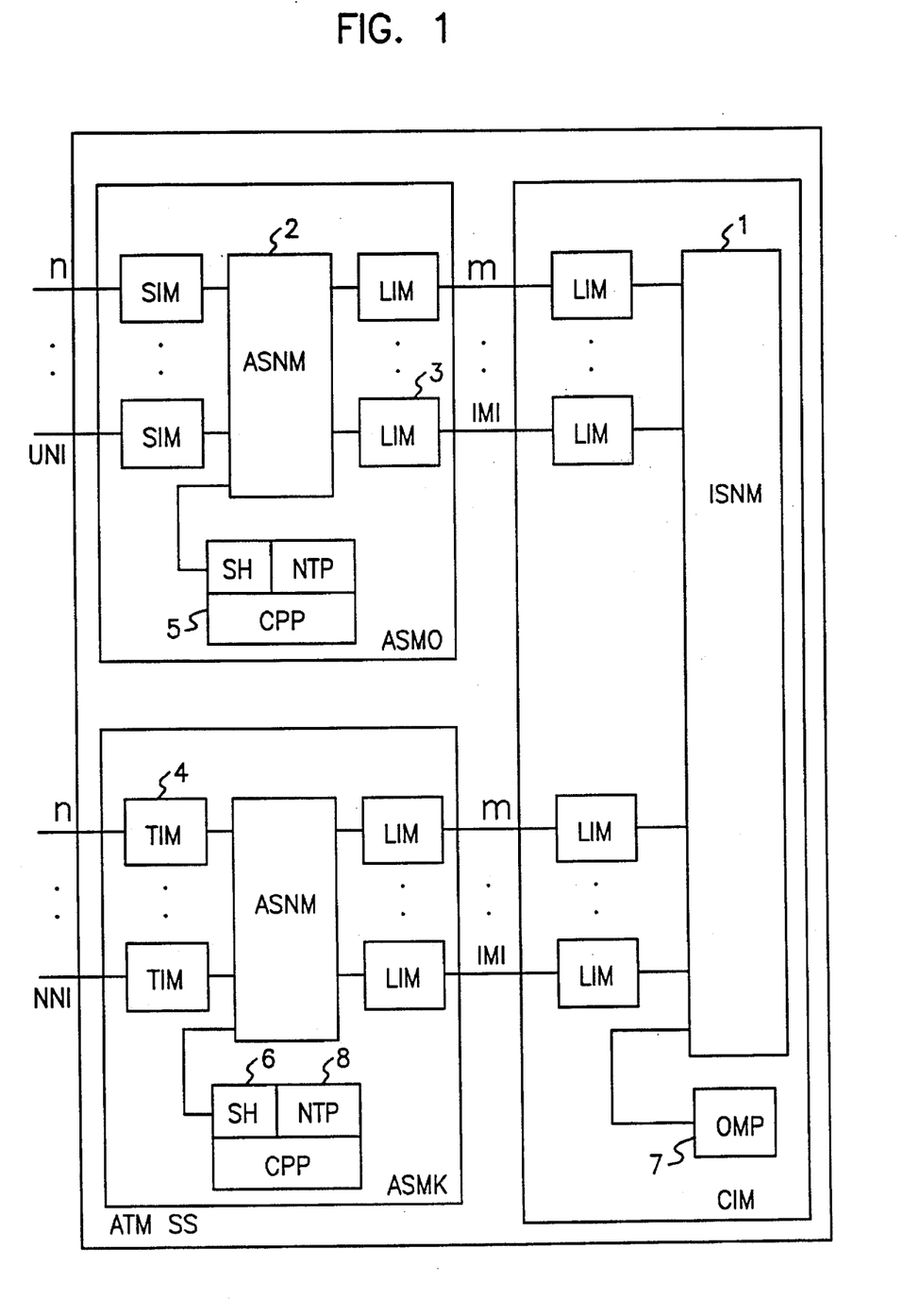
FIG. 1 is a block diagram of an ATM switching system to which the present invention is applied.

Referring to FIG. 1, there is shown a block diagram of an ATM switching system to which the present invention is applied. As shown in this drawing, the ATM switching system comprises a transfer network for performing the transfer of user information and control information, and a control network for controlling the transfer network.

The transfer network comprises an interconnection switch network module (referred to hereinafter as ISNM) 1 which is a switch network of a center interconnection module (referred to hereinafter as CIM), access switching network modules (referred to hereinafter as ASNMs) 2 of access switching modules (referred to hereinafter as ASMs) which are subscriber switching modules for performing concentrating operations, link interface modules (referred to hereinafter as LIMs) 3, each of which performs link interface operation between a corresponding one of the ASMs and the CIM, subscriber interface modules (referred to hereinafter as SIMs) 9 for performing subscriber interface operations, and trunk interface modules (referred to hereinafter as TIMs) 4 for performing trunk interface operations.

The control network comprises call processing parts (referred to hereinafter as CPPs) 5 for performing call control operations, signalling handlers (referred to hereinafter as SHs) 6 for performing signal handling operations, an operation/maintenance part (referred to hereinafter as OMP) 7 for performing operation and maintenance of the system, and number translation processors (referred to hereinafter as NTP) 8 for performing subscriber number translation operations.

Figure 2:
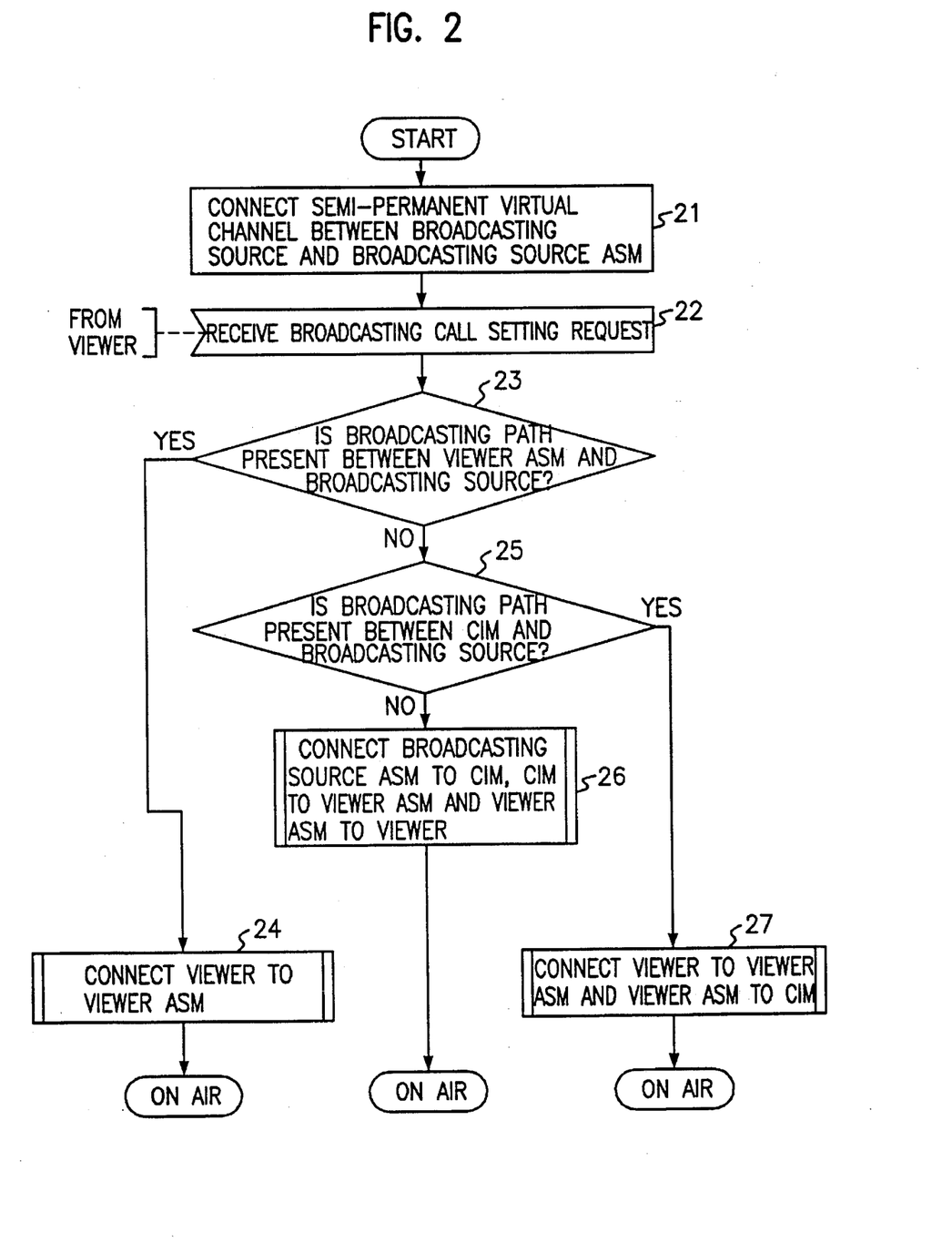
FIG. 2 is a flowchart illustrating a method of setting a television broadcasting call in the ATM switching system in FIG. 1 in accordance with the present invention.

Referring to FIG. 2, there is shown a flowchart illustrating a method of setting a television broadcasting call in the ATM switching system in FIG. 1 in accordance with the present invention. First, a semi-permanent virtual channel is connected between a broadcasting source and a broadcasting source one of the ASMs at a step 21 to transfer broadcasting information from the broadcasting source to the broadcasting source ASM. Upon receiving a broadcasting call setting request from a viewer at a step 22, it is discriminated at a step 23 whether a broadcasting path is present between a viewer one of the ASMs and the broadcasting source. This step 23 is performed to find the nearest switching module to the broadcasting source.

If it is discriminated at the step 23 that the broadcasting path is present between the viewer ASM and the broadcasting source, the viewer is newly connected to the viewer ASM at a step 24 with no separate connection to the broadcasting source. Then, the ASNM of the viewer ASM sets the broadcasting call to provide the broadcasting information for the newly connected viewer together with existing viewers. As a result, the current state becomes an on-air state. If it is discriminated at the step 23 that the broadcasting path is not present between the viewer ASM and the broadcasting source, it is discriminated at a step 25 whether the broadcasting path is present between the CIM and the broadcasting source. If it is discriminated at the step 25 that the broadcasting path is present between the CIM and the broadcasting source, the viewer is newly connected to the viewer ASM, which is also newly connected to the CIM, at a step 27. Then, the ISNM of the CIM sets the broadcasting call to provide the broadcasting information for the newly connected viewer ASM together with the ones of the ASMs which are presently provided with the broadcasting information. As a result, the current state becomes the on-air state. If it is discriminated at the step 25 that the broadcasting path is not present between the CIM and the broadcasting source, the broadcasting source ASM is newly connected to the CIM, which is also newly connected to the viewer ASM, at a step 26. The viewer ASM is also newly connected to the viewer. Then, the broadcasting call is set to transfer the broadcasting information from the broadcasting source to the viewer through the CIM and the viewer ASM. As a result, the current state becomes the on-air state.

Figure 3:
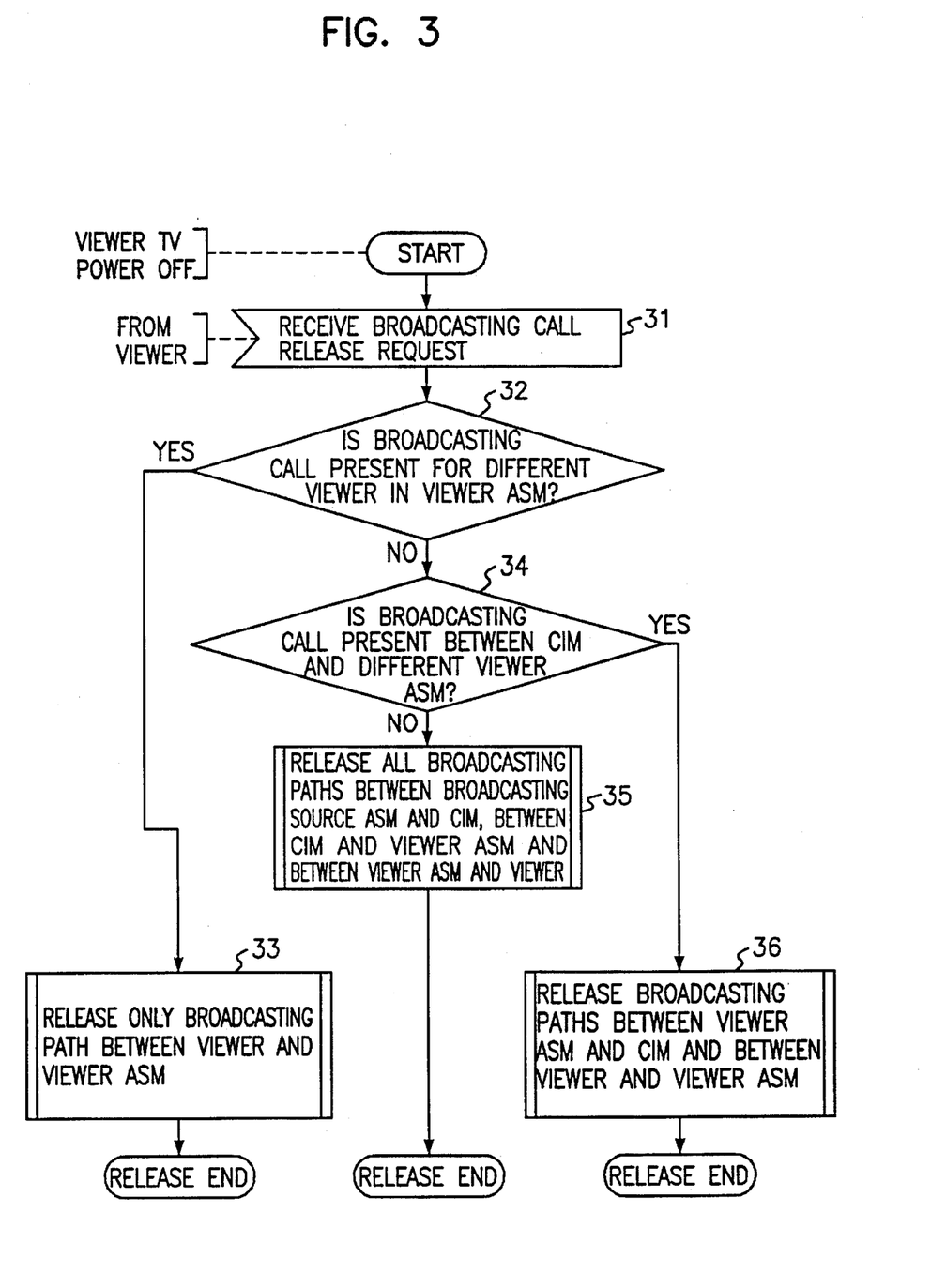
FIG. 3 is a flowchart illustrating a method of releasing the television broadcasting call in the ATM switching system in FIG. 1 in accordance with the present invention.

Referring to FIG. 3, there is shown a flowchart illustrating a method of releasing the television broadcasting call in the ATM switching system in FIG. 1 in accordance with the present invention. First, upon receiving a broadcasting call release request from the viewer at a step 31, it is discriminated at a step 32 whether the broadcasting call is present for a different viewer in the viewer ASM. If it is discriminated at the step 32 that a broadcasting call is present for the different viewer in the viewer ASM, only the broadcasting path between the viewer and the viewer ASM is released at a step 33.

If it is discriminated at the step 32 that a broadcasting call is not present for the different viewer in a viewer ASM, it is discriminated at the step 34 whether the broadcasting call is present between the CIM and a different viewer one of the ASMs. If it is discriminated at the step 34 that a broadcasting call is present between the CIM and the different viewer ASM, the broadcasting path between the viewer ASM and the CIM and the broadcasting path between the viewer and the viewer ASM are released at a step 36. If it is discriminated at the step 34 that a broadcasting call is not present between the CIM and the different viewer ASM, the broadcasting path between the broadcasting source ASM and the CIM, the broadcasting path between the CIM and the viewer ASM and the broadcasting path between the viewer ASM and the viewer are all released at a step 35.

Figure 4:
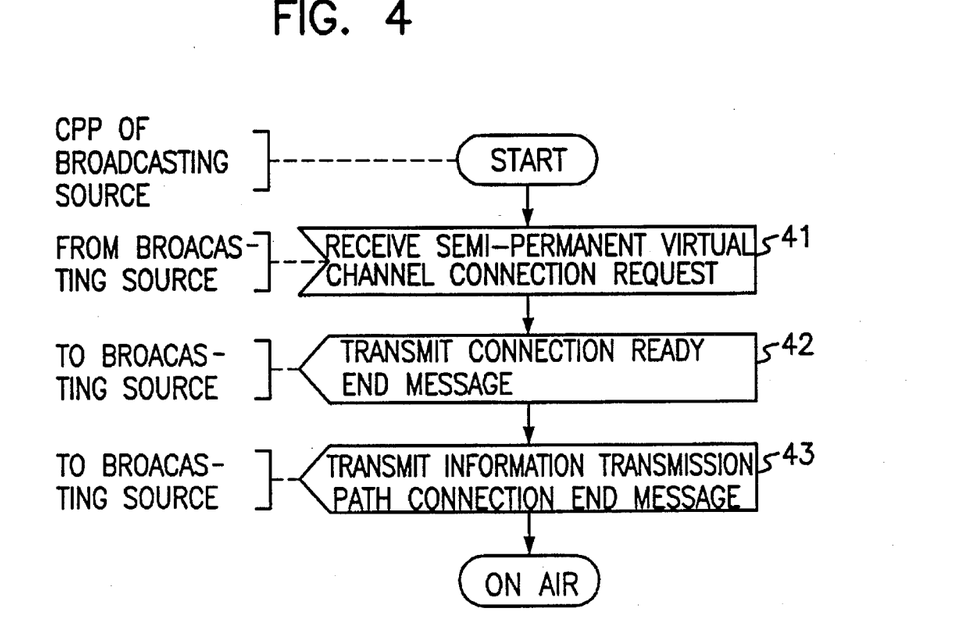
FIG. 4 is a flowchart illustrating in detail the step of connecting a semi-permanent virtual channel between a broadcasting source and a broadcasting source access switching module in the method of FIG. 2.

Referring to FIG. 4, there is shown a flowchart illustrating in detail the step 21 of connecting the semi-permanent virtual channel between the broadcasting source and the broadcasting source ASM in the method of FIG. 2. Upon receiving a semi-permanent virtual channel connection request from the broadcasting source at a step 41, the CPP of the broadcasting source ASM transmits a connection ready end message to the broadcasting source at a step 42. The connection ready end message includes a semi-permanent virtual channel value. Then, at a step 43, the CPP of the broadcasting source ASM transmits an information transmission path connection end message to the broadcasting source.

Figure 5:
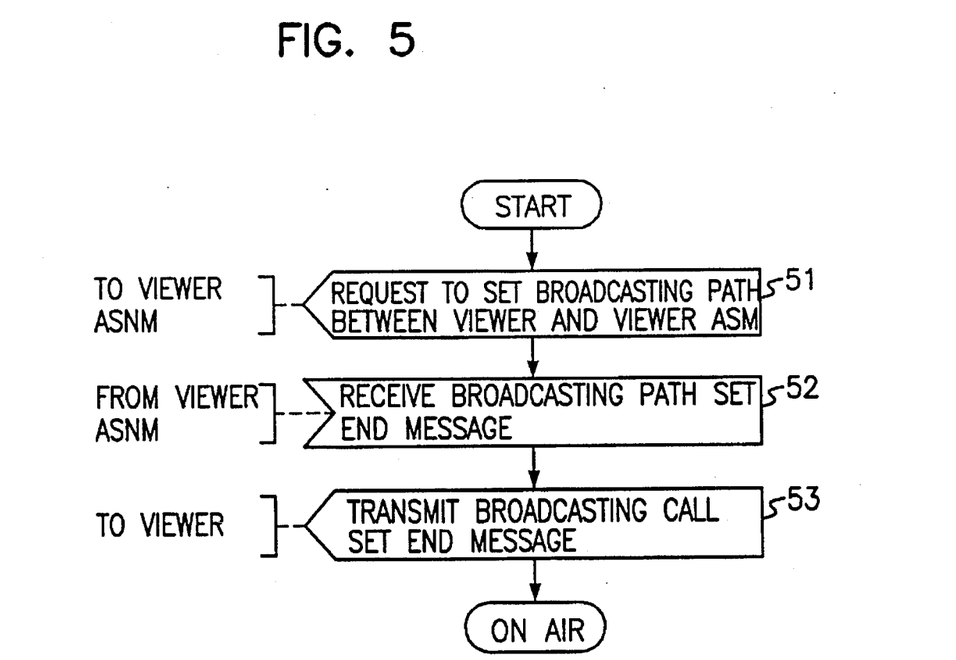
FIG. 5 is a flowchart illustrating in detail the step of setting the broadcasting call under the condition that a broadcasting path is present between a viewer access switching module and the broadcasting source in the method of FIG. 2.

Referring to FIG. 5, there is shown a flowchart illustrating in detail the step 24 of connecting the viewer ASM to the viewer under the condition that a broadcasting path is present between the viewer ASM and the broadcasting source in the method of FIG. 2. The CPP of the viewer ASM requests the ASNM of the viewer ASM to set the broadcasting path between the viewer and the viewer ASM, at a step 51. Upon receiving the broadcasting path set request from the CPP of the viewer ASM, the ASNM of the viewer ASM transmits a broadcasting path set end message to the CPP of the viewer ASM at a step 52. Then, at a step 53, the CPP of the viewer ASM transmits a broadcasting call set end message to the viewer.

Figure 6:
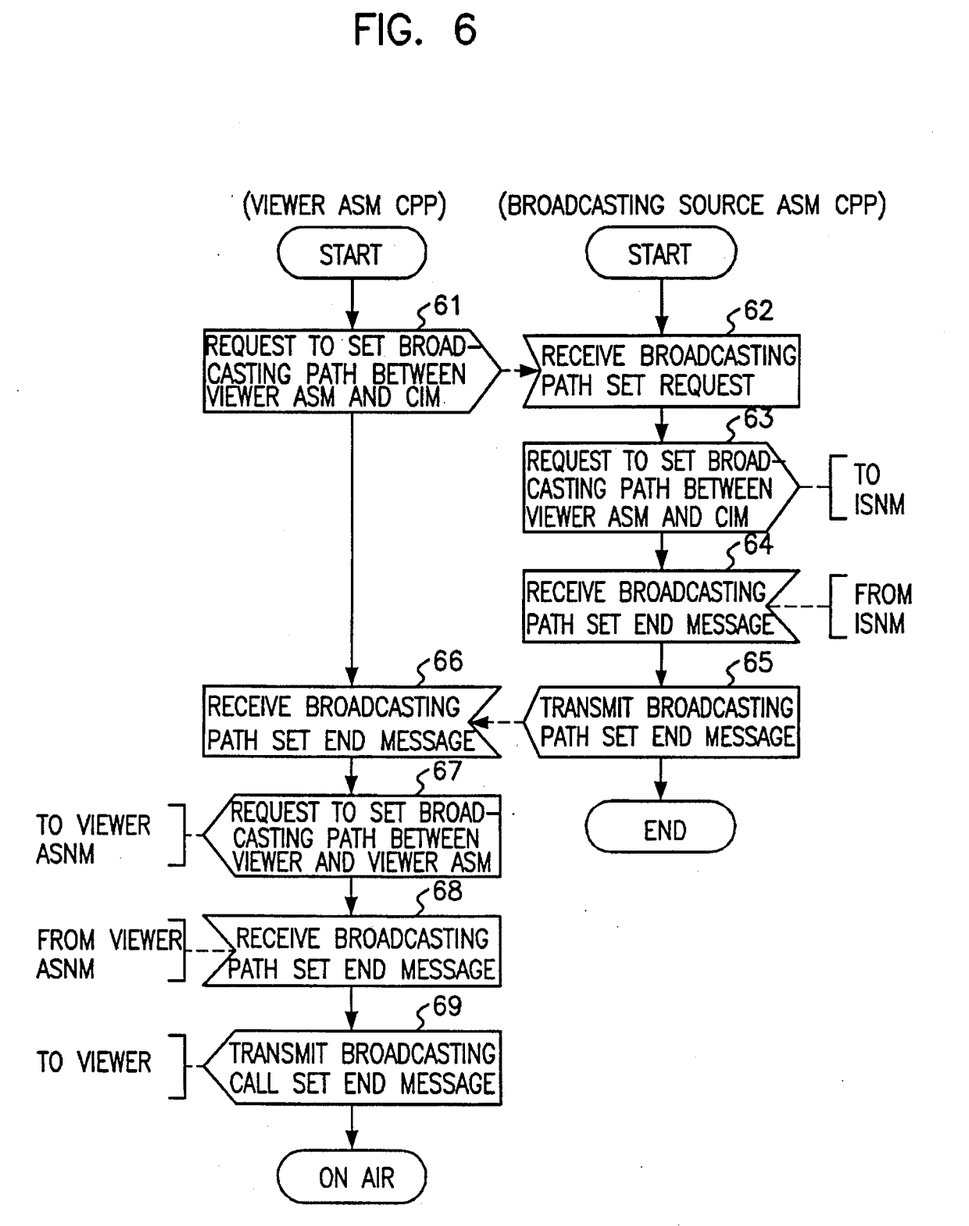
FIG. 6 is a flowchart illustrating in detail the step of setting the broadcasting call under the condition that the broadcasting path is present between a center interconnection module and the broadcasting source in the method of FIG. 2.

Referring to FIG. 6, there is shown a flowchart illustrating in detail the step 27 of connecting the viewer to the viewer ASM and the viewer ASM to the CIM under the condition that a broadcasting path is present between the CIM and the broadcasting source in the method of FIG. 2. The CPP of the viewer ASM requests the CPP of the broadcasting source ASM to set the broadcasting path between the viewer ASM and the CIM, at a step 61. Upon receiving the broadcasting path set request from the CPP of the viewer ASM at a step 62, the CPP of the broadcasting source ASM requests the ISNM of the CIM to set the broadcasting path between the viewer ASM and the CIM at a Step 63. Then, when receiving a broadcasting path set end message from the ISNM of the CIM at a step 64, the CPP of the broadcasting source ASM transmits the broadcasting path set end message to the CPP of the viewer ASM at a step 65.

Upon receiving the broadcasting path set end message from the CPP of a broadcasting source ASM at a step 66, the CPP of the viewer ASM requests the ASNM of the viewer ASM to set the broadcasting path between the viewer and the viewer ASM at a step 67. Then, when receiving a broadcasting path set end message from the ASNM of the viewer ASM at a step 68, the CPP 5 of the viewer ASM transmits a broadcasting call set end message to the viewer at a step 69.

Figure 7:
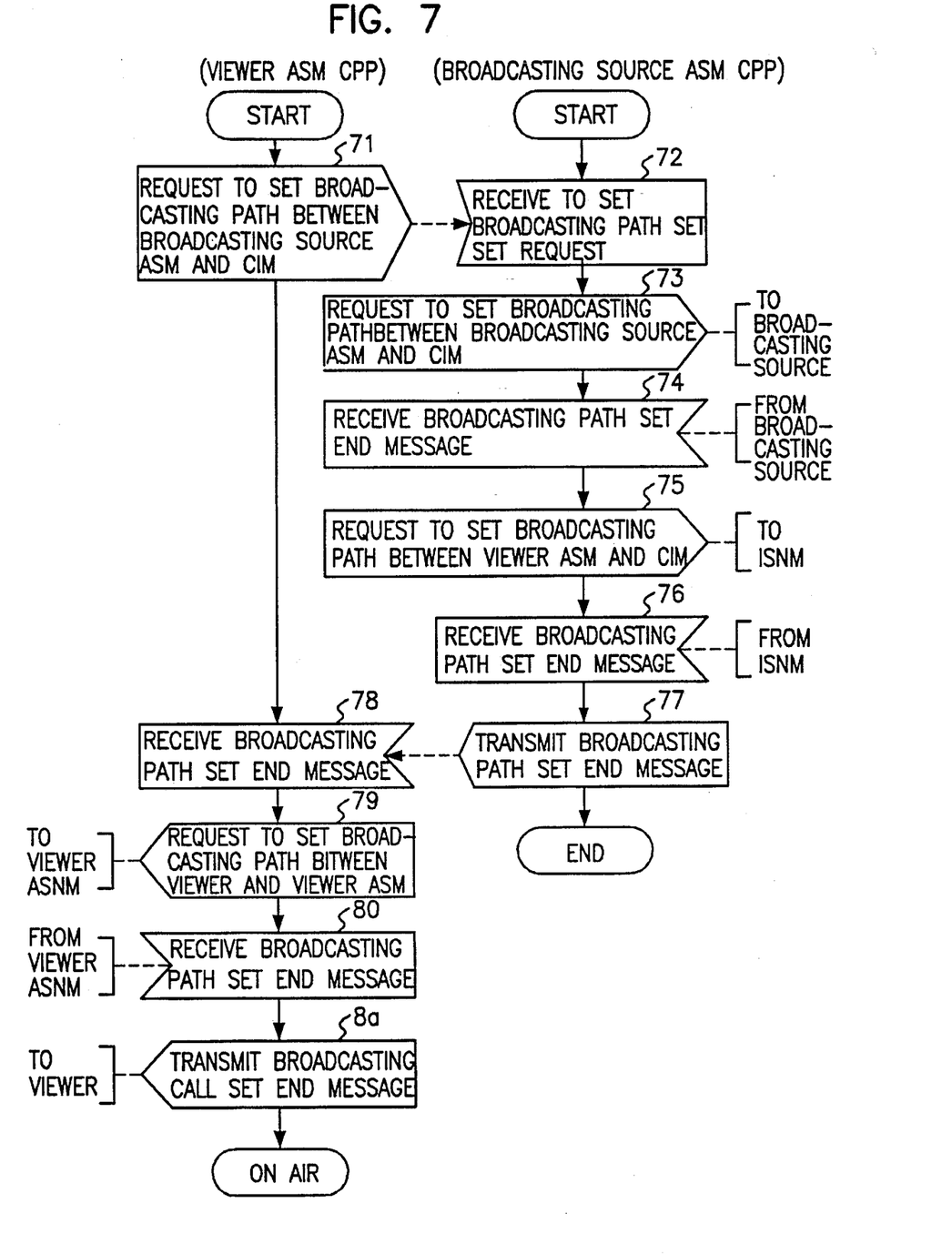
FIG. 7 is a flowchart illustrating in detail the step of setting the broadcasting call under the condition that the broadcasting path is present between the broadcasting source access switching module and the broadcasting source in the method of FIG. 2.

Referring to FIG. 7, there is shown a flowchart illustrating in detail the step 26 of connecting the broadcasting source ASM to the CIM, the CIM to the viewer ASM and the viewer ASM to the viewer under the condition that a broadcasting path is not present between the CIM and the broadcasting source in the method of FIG. 2. The CPP of the viewer ASM requests the CPP of the broadcasting source ASM to set the broadcasting path between the broadcasting source ASM and the CIM at a step 71. Upon receiving the broadcasting path set request from the CPP of the viewer ASM at a step 72, the CPP of the broadcasting source ASM requests the ASNM of the broadcasting source ASM to set the broadcasting path between the broadcasting source ASM and the CIM at a step 73. Then, when receiving a broadcasting path set end message from the ASNM of the broadcasting source ASM at a step 74, the CPP of the broadcasting source ASM requests the ISNM of the CIM to set the broadcasting path between the viewer ASM and the CIM at a step 75. Upon receiving a broadcasting path set end message from the ISNM of the CIM at a step 76, the CPP of the broadcasting source ASM transmits the broadcasting path set end message to the CPP of the viewer ASM at a step 77.

Upon receiving the broadcasting path set end message from the CPP of the broadcasting source ASM at a step 78, the CPP of the viewer ASM requests the ASNM of the viewer ASM to set the broadcasting path between the viewer and the viewer ASM at a step 79. Then, when receiving a broadcasting path set end message from the ASNM of the viewer ASM at a step 80, the CPP of the viewer ASM transmits a broadcasting call set end message to the viewer at a step 8a.

Figure 8:
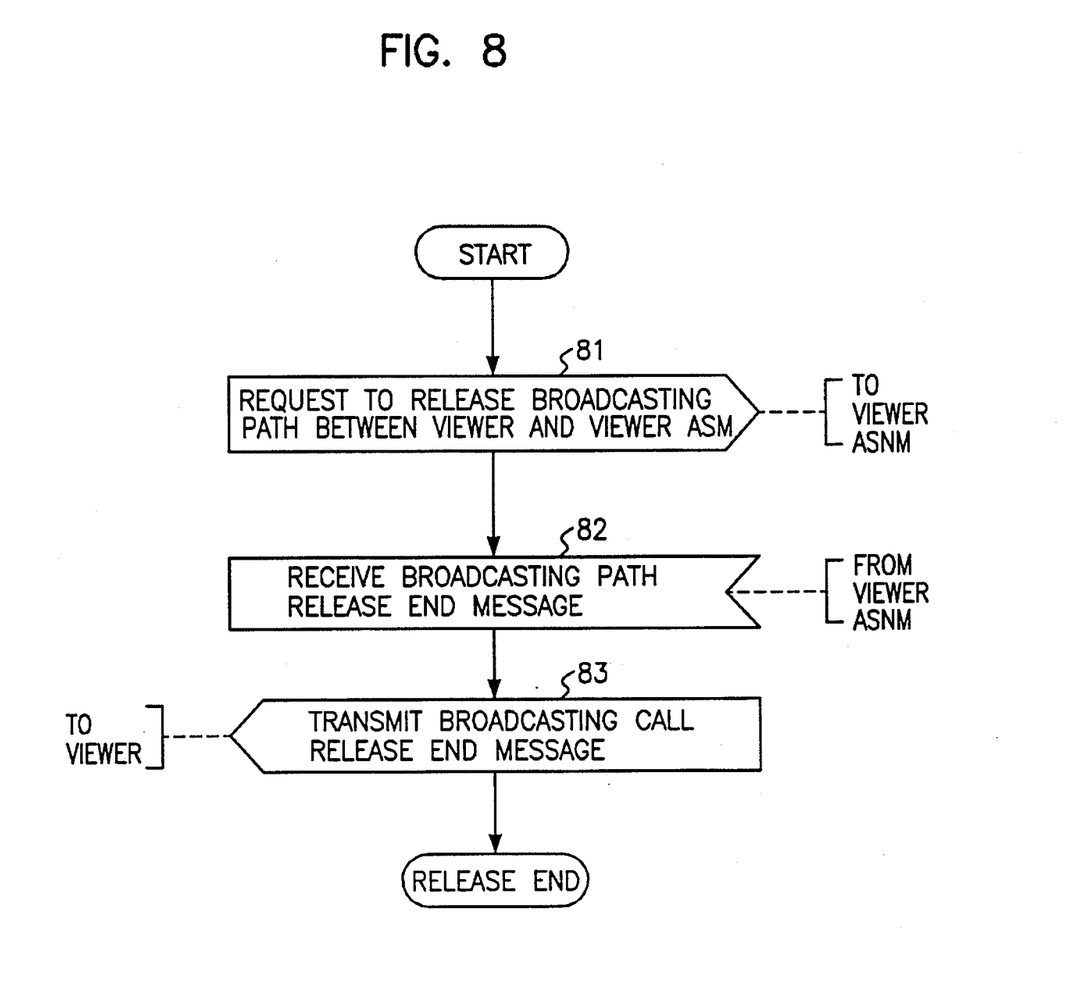
FIG. 8 is a flowchart illustrating in detail the step of releasing the broadcasting call between a viewer and the viewer access switching module in the method of FIG. 3.

Referring to FIG. 8, there is shown a flowchart illustrating in detail the step 33 of releasing only the broadcasting path between the viewer and the viewer ASM under the condition that a broadcasting call is present for the different viewer in the viewer ASM in the method of FIG. 3. At a step 81, the CPP of the viewer ASM requests the ASNM of the viewer ASM to release the broadcasting path between the viewer and the viewer ASM. Upon receiving a broadcasting path release end message from the ASNM of the viewer ASM at a step 82, the CPP of the viewer ASM transmits a broadcasting call release end message to the viewer at a step 83.

Figure 9:
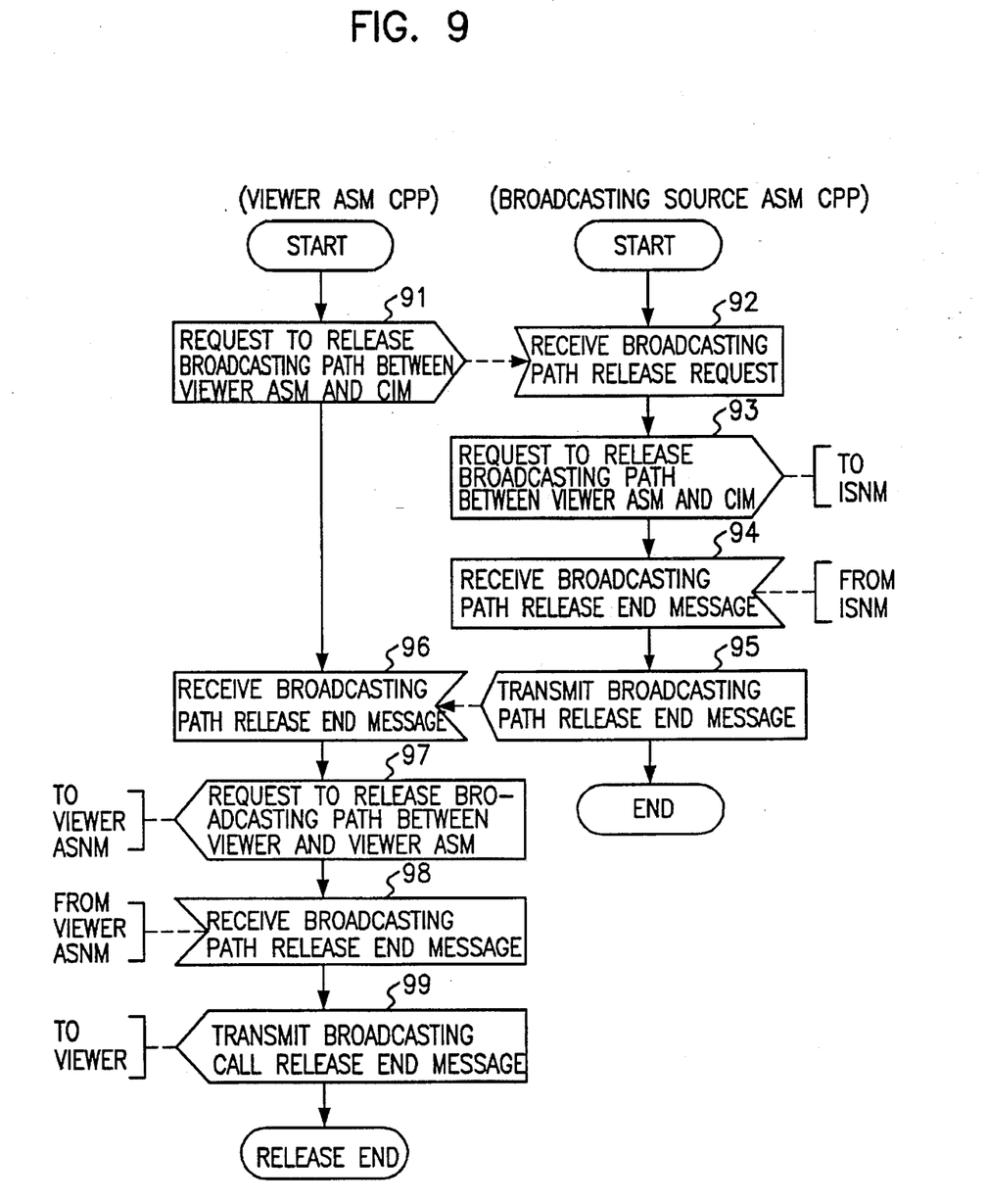
FIG. 9 is a flowchart illustrating in detail the step of releasing the broadcasting call between the viewer and the center interconnection module in the method of FIG. 3.

Referring to FIG. 9, there is shown a flowchart illustrating in detail the step 36 of releasing the broadcasting paths between the viewer ASM and the CIM and between the viewer and the viewer ASM under the condition that the broadcasting call is not present for the different viewer in the viewer ASM but between the CIM and the different viewer ASM in the method of FIG. 3. At a step 91, the CPP of the viewer ASM requests the CPP of the broadcasting source ASM to release the broadcasting path between the viewer ASM and the CIM. Upon receiving the broadcasting path release request from the CPP of the viewer ASM at a step 92, the CPP of the broadcasting source ASM requests the ISNM of the CIM to release the broadcasting path between the viewer ASM and the CIM at a step 93. Then, when receiving a broadcasting path release end message from the ISNM of the CIM at the step 94, the CPP of the broadcasting source ASM transmits the broadcasting path release end message to the CPP of the viewer ASM at a step 95.

Upon receiving the broadcasting path release end message from the CPP of the broadcasting source ASM at a step 96, the CPP of the viewer ASM requests the ASNM of the viewer ASM to release the broadcasting path between the viewer and the viewer ASM at a step 97. Then, when receiving a broadcasting path release end message from the ASNM of the viewer ASM at a step 98, the CPP of the viewer ASM transmits a broadcasting call release end message to the viewer at a step 99.

Figure 10:
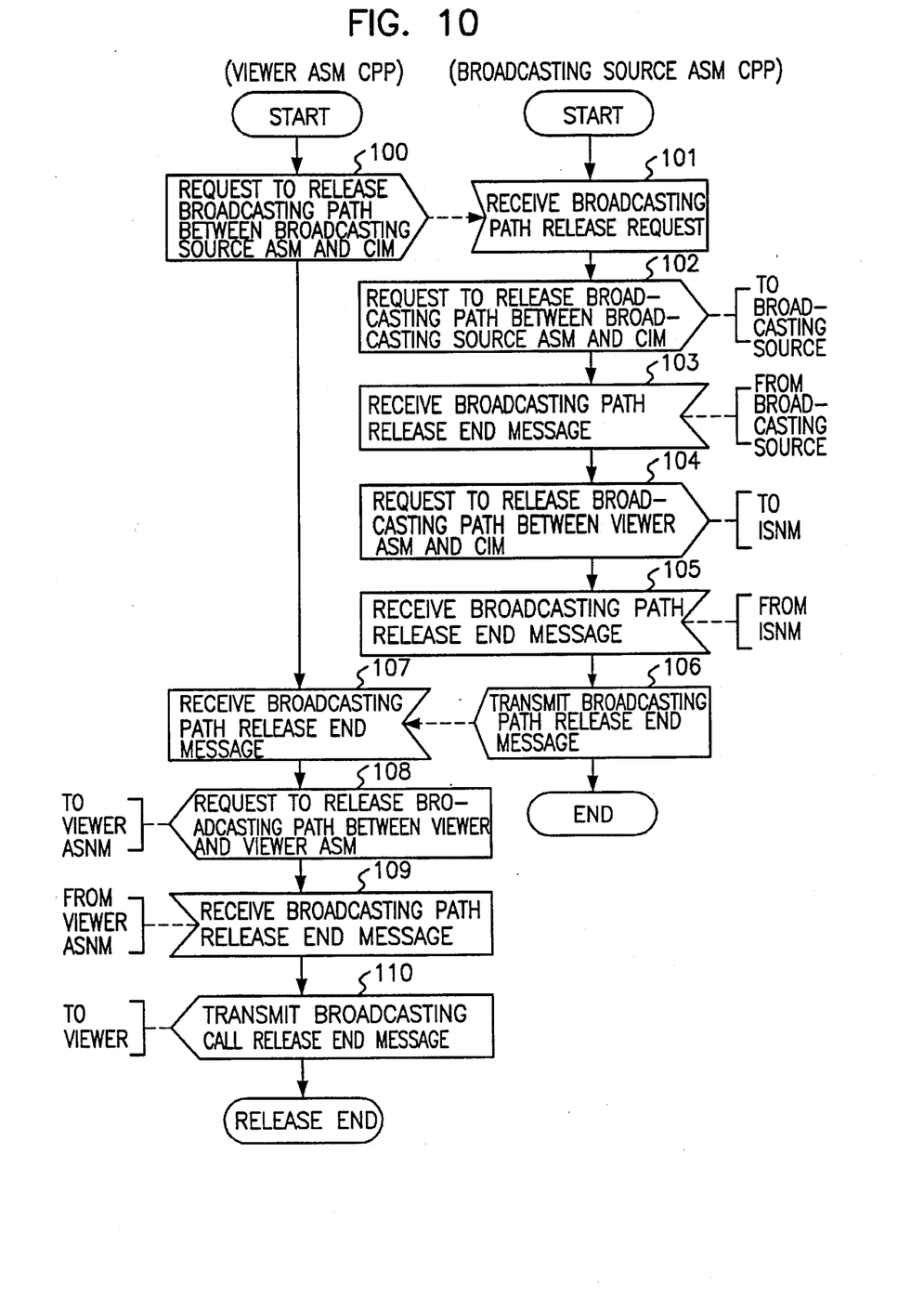
FIG. 10 is a flowchart illustrating in detail the step of releasing the broadcasting call between the viewer and the broadcasting source access switching module in the method of FIG. 3.

Referring to FIG. 10, there is shown a flowchart illustrating in detail the step 35 of releasing all the broadcasting paths between the broadcasting source ASM and the CIM, between the CIM and the viewer ASM and between the viewer ASM and the viewer under the condition that a broadcasting call is not present between the CIM and the different viewer ASM as well as for the different viewer in the viewer ASM in the method of FIG. 3. At a step 100, the CPP of the viewer ASM requests the CPP of the broadcasting source ASM to release the broadcasting path between the broadcasting source ASM and the CIM. Upon receiving the broadcasting path release request from the CPP of the viewer ASM at a step 101, the CPP of the broadcasting source ASM requests the ASNM of the broadcasting source ASM to release the broadcasting path between the broadcasting source ASM and the CIM at a step 102. Then, when receiving a broadcasting path release end message from the ASNM of a broadcasting source ASM at a step 103, the CPP of the broadcasting source ASM requests the ISNM of the CIM to release the broadcasting path between the viewer ASM and the CIM at a step 104. Upon receiving a broadcasting path release end message from the ISNM of the CIM at a step 105, the CPP of the broadcasting source ASM transmits the broadcasting path release end message to the CPP of the viewer ASM at a step 106.

Upon receiving the broadcasting path release end message from the CPP of the broadcasting source ASM at a step 107, the CPP of the viewer ASM requests the ASNM of the viewer ASM to release the broadcasting path between the viewer and the viewer ASM at a step 108. Then, when receiving a broadcasting path release end message from the ASNM of the viewer ASM at a step 109, the CPP of the viewer ASM transmits a broadcasting call release end message to the viewer at a step 110.

As apparent from the above description, according to the present invention, the provision of the television broadcasting call in the ATM switching system is not performed by previously connecting all the information transmission paths between the broadcasting source and the viewer (subscriber) but by connecting the information transmission paths of the nearest switching modules (ASM and CIM) between the broadcasting source and the viewer according to the requirement of the viewer under the condition that a semi-permanent connection is made between the broadcasting source and the ATM switching system. Therefore, the processing capability of the ATM switching system can be enhanced. The present invention can basically realize various B-ISDN services in the future.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of controlling a television broadcasting call in an asynchronous transfer mode switching system having an interconnection switch network module which is a switch network of a center interconnection module, access switching network modules of access switching modules which are subscriber switching modules for performing concentrating operations, link interface modules, each of which performs a link interface operation between a corresponding one of said access switching modules and said center interconnection module, subscriber interface modules for performing subscriber interface operations and trunk interface modules for performing trunk interface operations, comprising the steps of:

(a) connecting a semi-permanent virtual channel between a broadcasting source and a broadcasting source access switching module to transfer broadcasting information from said broadcasting source to said broadcasting source access switching module and discriminating whether a broadcasting path is present between a viewer access switching module and said broadcasting source, upon receiving a broadcasting call setting request from a viewer;

(b) connecting newly the viewer to said viewer access switching module to set the broadcasting call, if it is discriminated at said step (a) that a broadcasting path is present between said viewer access switching module and said broadcasting source;

(c) discriminating whether the broadcasting path is present between said center interconnection module and said broadcasting source, if it is discriminated at said step (a) that a broadcasting path is not present between said viewer access switching module and said broadcasting source;

(d) connecting newly the viewer to said viewer access switching module and said viewer access switching module to said center interconnection module to set the broadcasting call, if it is discriminated at said step (c) that a broadcasting path is present between said center interconnection module and said broadcasting source;

(e) connecting newly said broadcasting source access switching module to said center interconnection module, said center interconnection module to said viewer access switching module and said viewer access switching module to the viewer to set the broadcasting call, if it is discriminated at said step (c) that a broadcasting path is not present between said center interconnection module and said broadcasting source;

(f) discriminating whether the broadcasting call is present for a different viewer in said viewer access switching module, upon receiving a broadcasting call release request from the viewer;

(g) releasing only the broadcasting path between the viewer and said viewer access switching module if it is discriminated at said step (f) that a broadcasting call is present for the different viewer in said viewer access switching module;

(h) discriminating whether the broadcasting call is present between said center interconnection module and a different viewer one of said access switching modules, if it is discriminated at said step (f) that a broadcasting call is not present for the different viewer in said viewer access switching module;

(i) releasing the broadcasting path between said viewer access switching module and said center interconnection module and the broadcasting path between the viewer and said viewer access switching module if it is discriminated at said step (h) that a broadcasting call is present between said center interconnection module and said different viewer access switching module; and (j) releasing the broadcasting path between said broadcasting source access switching module and said center interconnection module, the broadcasting path between said center interconnection module and said viewer access switching module and the broadcasting path between said viewer access switching module and the viewer if it is discriminated at said step (h) that a broadcasting call is not present between said center interconnection module and said different viewer access switching module.

2. A method of controlling a television broadcasting call in an asynchronous transfer mode switching system, as set forth in claim 1, wherein said step (a) includes the steps of:

(a-1) allowing a call processing part of said broadcasting source access switching module to transmit a connection ready end message to said broadcasting source upon receiving a semi-permanent virtual channel connection request from said broadcasting source; and (a-2) allowing said call processing part of said broadcasting source access switching module to transmit an information transmission path connection end message to said broadcasting source.

3. A method of controlling a television broadcasting call in an asynchronous transfer mode switching system, as set forth in claim 1, wherein said step (b) includes the steps of:

(b-1) allowing said access switching network module of said viewer access switching module to transmit a broadcasting path set end message to a call processing part of said viewer access switching module, if said call processing part of said viewer access switching module requests said access switching network module of said viewer access switching module to set the broadcasting path between the viewer and said viewer access switching module; and (b-2) allowing said call processing part of said viewer access switching module, upon receiving the broadcasting path set end message from said access switching network module of said viewer access switching module, to transmit a broadcasting call set end message to the viewer.

4. A method of controlling a television broadcasting call in an asynchronous transfer mode switching system, as set forth in claim 1, wherein said step (d) includes the steps of:

(d-1) allowing a call processing part of said viewer access switching module to request a call processing part of said broadcasting source access switching module to set the broadcasting path between said viewer access switching module and said center interconnection module;

(d-2) allowing said call processing part of said broadcasting source access switching module, upon receiving the broadcasting path set request from said call processing part of said viewer access switching module, to request said interconnection switch network module of said center interconnection module to set the broadcasting path between said viewer access switching module and said center interconnection module;

(d-3) allowing said call processing part of said broadcasting source access switching module to transmit a broadcasting path set end message to said call processing part of said viewer access switching module upon receiving the broadcasting path set end message from said interconnection switch network module of said center interconnection module; and (d-4) allowing said call processing part of said viewer access switching module, upon receiving the broadcasting path set end message from said call processing part of said broadcasting source access switching module, to request said access switching network module of said viewer access switching module to set the broadcasting path between the viewer and the viewer access switching module and allowing said call processing part of said viewer access switching module, upon receiving a broadcasting path set end message from said access switching network module of said viewer access switching module, to transmit a broadcasting call set end message to the viewer.

5. A method of controlling a television broadcasting call in an asynchronous transfer mode switching system, as set forth in claim 1, wherein said step (e) includes the steps of:

(e-1) allowing a call processing part of said viewer access switching module to request a call processing part of said broadcasting source access switching module to set the broadcasting path between said broadcasting source access switching module and said center interconnection module;

(e-2) allowing said call processing part of said broadcasting source access switching module, upon receiving the broadcasting path set request from said call processing part of said viewer access switching module, to request said access switching network module of said broadcasting source access switching module to set the broadcasting path between said broadcasting source access switching module and said center interconnection module;

(e-3) allowing said call processing part of said broadcasting source access switching module, upon receiving a broadcasting path set end message from said access switching network module of said broadcasting source access switching module, to request said interconnection switch network module of said center interconnection module to set the broadcasting path between said viewer access switching module and said center interconnection module;

(e-4) allowing said call processing part of said broadcasting source access switching module, upon receiving a broadcasting path set end message from said interconnection switch network module of said center interconnection module, to transmit the broadcasting path set end message to said call processing part of said viewer access switching module and allowing said call processing part of said viewer access switching module, upon receiving the broadcasting path set end message from said call processing part of said broadcasting source access switching module, to request said access switching network module of said viewer access switching module to set the broadcasting path between the viewer and said viewer access switching module; and (e-5) allowing said call processing part of said viewer access switching module, upon receiving a broadcasting path set end message from said access switching network module of said viewer access switching module, to transmit a broadcasting call set end message to the viewer.

6. A method of controlling a television broadcasting call in an asynchronous transfer mode switching system, as set forth in claim 1, wherein said step (g) includes the steps of:

(g-1) allowing a call processing part of said viewer access switching module to request said access switching network module of said viewer access switching module to release the broadcasting path between the viewer and said viewer access switching module; and (g-2) allowing said call processing part of said viewer access switching module, upon receiving a broadcasting path release end message from said access switching network module of said viewer access switching module, to transmit a broadcasting call release end message to the viewer.

7. A method of controlling a television broadcasting call in an asynchronous transfer mode switching system, as set forth in claim 1, wherein said step (i) includes the steps of:

(i-1) allowing a call processing part of said viewer access switching module to request a call processing part of said broadcasting source access switching module to release the broadcasting path between said viewer access switching module and said center interconnection module;

(i-2) allowing said call processing part of said broadcasting source access switching module, upon receiving the broadcasting path release request from said call processing part of said viewer access switching module, to request said interconnection switch network module of said center interconnection module to release the broadcasting path between said viewer access switching module and said center interconnection module and allowing said call processing part of said broadcasting source access switching module, upon receiving a broadcasting path release end message from said interconnection switch network module of said center interconnection module, to transmit the broadcasting path release end message to said call processing part of said viewer access switching nodule; and (i-3) allowing said call processing part of said viewer access switching module, upon receiving the broadcasting path release end message from said call processing part of said broadcasting source access switching module, to request said access switching network module of said viewer access switching module to release the broadcasting path between the viewer and said viewer access switching module and allowing said call processing part of said viewer access switching module, upon receiving a broadcasting path release end message from said access switching network module of said viewer access switching module, to transmit a broadcasting call release end message to the viewer.

8. A method of controlling a television broadcasting call in an asynchronous transfer mode switching system, as set forth in claim 1, wherein said step (j) includes the steps of:

(j-1) allowing a call processing part of said viewer access switching module to request a call processing part of said broadcasting source access switching module to release the broadcasting path between said broadcasting source access switching module and said center interconnection module;

(j-2) allowing said call processing part of said broadcasting source access switching module, upon receiving the broadcasting path release request from said call processing part of said viewer access switching module, to request said access switching network module of said broadcasting source access switching module to release the broadcasting path between said broadcasting source access switching module and said center interconnection module;

(j-3) allowing said call processing part of said broadcasting source access switching module, upon receiving a broadcasting path release end message from said access switching network module of said broadcasting source access switching module, to request said interconnection switch network module of said center interconnection module to release the broadcasting path between said viewer access switching module and said center interconnection module and allowing said call processing part of the broadcasting source access switching module, upon receiving a broadcasting path release end message from said interconnection switch network module of said center interconnection module, to transmit the broadcasting path release end message to said call processing part of said viewer access switching module; and (j-4) allowing said call processing part of said viewer access switching module, upon receiving the broadcasting path release end message from said call processing part of said broadcasting source access switching module, to request said access switching network module of said viewer access switching module to release the broadcasting path between the viewer and said viewer access switching module and allowing said call processing part of said viewer access switching module, upon receiving a broadcasting path release end message from said access switching network module of said viewer access switching module, to transmit a broadcasting call release end message to the viewer.

* * * * *

UNITED STATES PATENT AND TRADEMARK OFFICE
CERTIFICATE OF CORRECTION

PATENT NO. : 5,570,125
DATED : October 29, 1996
INVENTOR(S) : Moon K. OH ET AL.

It is certified that error appears in the above-indentified patent and that said Letters Patent is hereby corrected as shown below:

On the title page, item [73] should read as follows:

[73] Electronics and Telecommunications Research Institute, Seoul, Republic of Korea
and
Korea Telecommunication Authority, Seoul, Republic of Korea Signed and Sealed this Seventh Day of July, 1998

Attest:

BRUCE LEHMAN

*Attesting Officer*  *Commissioner of Patents and Trademarks*